(12) United States Patent
Jennerjahn

(10) Patent No.: US 7,157,901 B1
(45) Date of Patent: Jan. 2, 2007

(54) INDUCTIVE SENSOR (SPEED SENSOR) WITH A CONICAL COIL BASE BODY

(75) Inventor: Andreas Jennerjahn, Eisenach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/958,283

(22) PCT Filed: Jan. 26, 2000

(86) PCT No.: PCT/DE01/00309

§ 371 (c)(1),
(2), (4) Date: Apr. 29, 2002

(87) PCT Pub. No.: WO01/59464

PCT Pub. Date: Aug. 16, 2001

(30) Foreign Application Priority Data

Feb. 8, 2000 (DE) ................................ 100 05 513

(51) Int. Cl.
G01B 7/14 (2006.01)

(52) U.S. Cl. ................................. 324/207.15

(58) Field of Classification Search ........... 324/207.15, 324/174, 207.25, 239; 29/595, 602.1, 607; 336/110, 231
See application file for complete search history.

(56) References Cited

U.S. PATENT DOCUMENTS

| 5,032,790 | A | | 7/1991 | Johnson |
| 5,227,719 | A | | 7/1993 | Peterson et al. |
| 5,302,929 | A | | 4/1994 | Kovacs |
| 5,335,642 | A | * | 8/1994 | Hancock et al. ............ 123/634 |
| 5,351,388 | A | * | 10/1994 | Van Den Berg et al. ... 29/602.1 |
| 5,363,033 | A | * | 11/1994 | Suda et al. ............ 324/207.15 |
| 5,426,844 | A | * | 6/1995 | Suda et al. .................... 29/606 |
| 6,513,278 | B1 | * | 2/2003 | Jørgensen .................. 43/44.84 |

FOREIGN PATENT DOCUMENTS

| DE | 33 44 959 A1 | 8/1985 |
| DE | 36 28 585 A | 3/1988 |
| DE | 41 22 548 A | 1/1993 |
| DE | 42 28 888 A | 3/1994 |
| DE | 195 13 464 A | 6/1996 |
| DE | 196 32 975 A1 | 10/1997 |
| EP | 0 632 897 B1 | 4/1998 |
| FR | 2 762 442 A | 10/1998 |
| HU | 212 558 B | 3/1992 |
| SU | 978 048 | 11/1982 |
| SU | 1144052 A | 3/1985 |

OTHER PUBLICATIONS

Patent Abstracts of Japan 07063775 A Mar. 10, 1995.
Instruments and Control Systems, Oct. 1970, vol. 43, H. 10, p. 52.

* cited by examiner

Primary Examiner—Reena Aurora
(74) Attorney, Agent, or Firm—Michael J. Striker

(57) ABSTRACT

In summary, the present invention concerns an inductive sensor, in particular rpm sensor, having a housing (4) with a main housing body (5) and a coil base body (6), whereby a coil is wound around the coil base body (6). The sensor also comprises a magnet (2) that is situated in the housing and has a pole pin (3). The coil base body (6) of the housing (4) is thereby designed entirely conical, in particular slightly conical, in shape.

10 Claims, 2 Drawing Sheets

INDUCTIVE SENSOR (SPEED SENSOR) WITH A CONICAL COIL BASE BODY

BACKGROUND OF THE INVENTION

The present invention concerns an inductive sensor, in particular rpm sensor.

Inductive sensors are used, for example, to detect the rpm's of a vehicle wheel as an rpm sensor for antilock systems. This is a passive inductive sensor, the function of which is based on the principle of electromagnetic induction. A ferromagnetic pulse wheel permanently mounted on the wheel axle induces a voltage that is a function of the rpm's in a coil of the sensor attached at a constant distance in that it changes the direction of the magnetic field over the rising and falling flanks of the teeth of the pulse wheel. A sensor of this type is shown in FIGS. 4 and 5. An inductive sensor of this type comprises a housing 4 in which a permanent magnet 2 having a pole pin 3 is situated. The magnet 2 comprises a ferrite core (AlNiCo) and a cold-formed pole core to conduct and bundle the magnetic lines of force. As shown in FIG. 4, the cold-formed pole core is designed partially conical in shape as a result of production. The housing 4 comprises a main housing body 5 and a coil base body 6.

As one can see in FIG. 4, the coil base body 6 comprises a conical region 6a and a cylindrical region 6b. Furthermore, coil base channels 9, 9a, 9b are situated in the coil base body 6 for accommodating wires.

To produce the coil, a wire is wound around the coil base body 6. After connection to a conductor rail by way of an input port, the wire is placed in the coil base channel 9 on the upper, larger circumference of the cone and, after a three-quarter turn, it is slid into the diagonal coil base channel, so it can then be inserted in the coil base channel on the lower, smaller, circumference of the cone (refer to FIG. 5). In the lower coil base channel, the wire is laid in place with four rotations and then directed out of the coil base channel and used to wind the coil. The area of the coil base body 6 having the smaller cylindrical diameter 6b between a first coil shield 7 and the area 6a designed in the shape of a cone is thereby filled up first until the larger diameter of the cone 6a is reached. Approximately 4200 windings out of approximately 7200 windings in all are needed in order to fill up this space at the cone 6a and the small cylindrical area 6b. The coil can then be wound in cylindrical fashion from the first coil shield 7 to the second coil shield 8.

After extrusion coating, outlines and/or cavities of the coil base channels 9, 9a and 9b are often noticeable on the outer circumference of the coil when the coil is removed. Moreover, the wire often ascends in the direction of the larger diameter of the conical area 6a when the wire is wound between the first coil shield 7 and the conical area 6a. As a result, the wire cannot be arranged on the coil in defined fashion. Additionally, this often causes snarls in the winding wire.

To protect the coil, it is covered directly with a direct extrusion coating of plastic after winding. The coil base body is usually produced out of PA6, and the extrusion coating is produced out of PA6.6. As a result, the lower melting point of PA6 (approximately 214° C.) can be used to achieve a melting-on of the ring-shaped melting tips on the coil shield in order to produce the tightness during extrusion coating with the plastic PA6.6 (melting point: approximately 228° C.) at a processing temperature at the hot nozzles of approximately 305° C.

Due to the construction described above and the manufacturing process for the inductive sensor in the related art, problems occur when the temperature changes. For example, automobile manufacturers require that the product pass a thermal shock test comprising at least 1000 temperature changes from a temperature of −30° C. to a temperature of +100° C. for 30 minutes each without fault, whereby the target temperature must be reached within five minutes. The sensors described above according to the related art only reach approximately 200 temperature changes, however. As a result, the sensors are destroyed due to fatigue fractures in the coil wire which occur, in particular, at the coil base channels and at the input port of the coil wire.

Moreover, an inductive sensor is made known in EP-632897 in which a contact zone on the ends of the windings of the coil and the conductor rails is covered with a silicone mass and a band made of polyimide material toward the injection- molded housing. Although this improves the robustness against temperature changes, the required number of 1000 temperature changes cannot be achieved using this type of inductive sensor, either.

SUMMARY OF THE INVENTION

In contrast, the inductive sensor according to the invention has the advantage that the coil base body is designed entirely in the shape of a cone. Due to the conical shape of the coil base body, there is no need to provide coil base channels. In particular, this can prevent the coil wire from becoming damaged at the coil base channels during winding or extrusion coating of the coil, which eventually leads to a break in the coil wire if frequent temperature changes occur. Moreover, this can result in an increase in the mechanical resistant of the wound coil to the extrusion-coating pressure, since the coil has a cylindrical or only slightly conical outer circumference after winding. As a further advantage, the provision of the conical coil base body can reduce the number of windings, because there is no need to fill a cylindrical zone having a small diameter, as in the related art. Likewise, there is no need for the costly, complicated procedure of placing the wire in the coil base channels. This reduces the winding time, so that the inductive sensor according to the invention can be produced cost-effectively. It is also possible according to the invention to linearize the ohmic resistance per winding R(n), which results in an increased consistency of resistance. Furthermore, using the inductive sensor according to the invention, more than 1750 temperature changes are achieved in a thermal shock test between −30° C. and +100° C.

The angle of the exterior circumference of the conical coil base body to a center line of the inductive sensor is preferably approximately 2.85° C. Due to this slightly conical coil base body, it is ensured in particular that the winding wire does not ascend in the direction of the larger diameter of the cone. In particular, this also prevents the winding wire from snarling. The consistency of resistance can be increased as a result, and the number of reject parts can be reduced significantly.

In a preferred embodiment of the present invention, the windings of the coil on the coil base body are arranged in parallel. As a result, a defined design of the coil can be achieved using the windings. The windings of the coil are thereby preferably arranged in parallel from a first coil shield to a second coil shield, i.e., one winding next to the other one.

An extrusion coating of the coil is preferably produced out of the same material as the coil base body. As a result, it can be ensured that tensions resulting from different expansion and compression do not damage the wire in the channels of the contact rails to the winding and vice versa. The plastic PA6.12 is hereby 23 preferably used as the material.

As one can see in FIGS. 1 and 4, the pole core 3 is designed conical in shape and has sections with different diameter. The wall of the coil body, in particular of the coil base body, facing the pole core 3 corresponds with the shape of the pole core for reasons of space. As one can see by comparing FIGS. 1 and 4, the slightly conical shape means a thicker formation of the wall of the coil base body. More material is required to create the slightly conical shape. This would increase the size while maintaining the same coil ratios as in the related art. The advantageous shape of the coil base body results in a more harmonic distribution of the windings, however. The "density" of the winding based on the length and volume of the coil base body is increased. A smaller number of windings is used to achieve the same performance as with the related art, without resulting in a taller design than with the related art. It is also particularly advantageous that the ohmic resistance remains constant within a series.

BRIEF DESCRIPTION OF THE DRAWINGS

An embodiment of the invention is shown in the diagram and will be explained in greater detail in the description below.

DESCRIPTION OF THE PREFERRED EMBODIMENT

Figure 1:
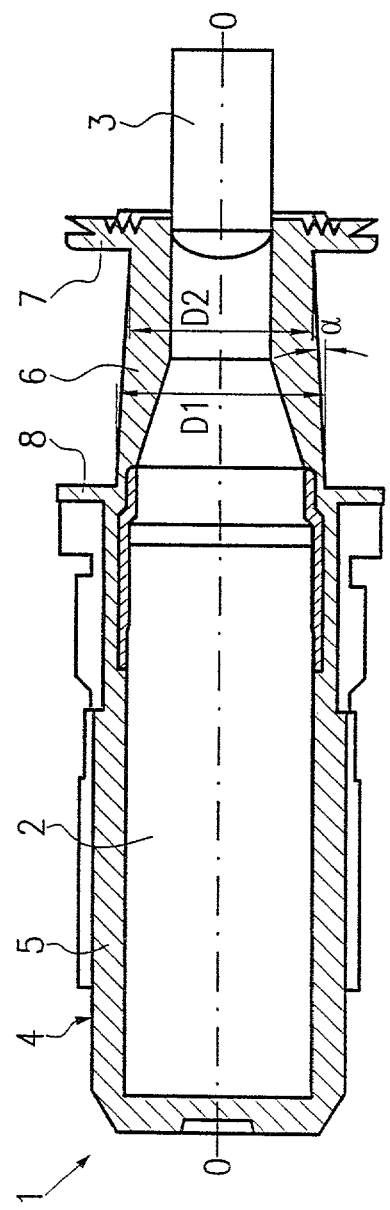
FIG. 1 shows a sectional view of an inductive sensor according to a first embodiment of the present invention.
Figure 2:
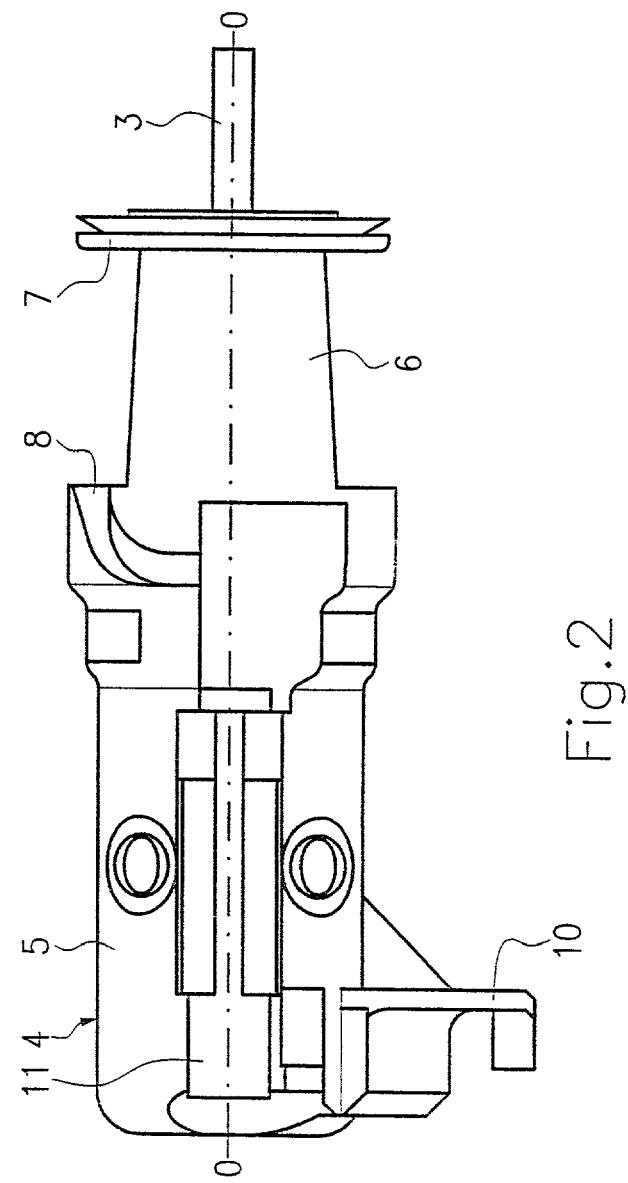
FIG. 2 shows a side view of the inductive sensor shown in FIG. 1.
Figure 3:
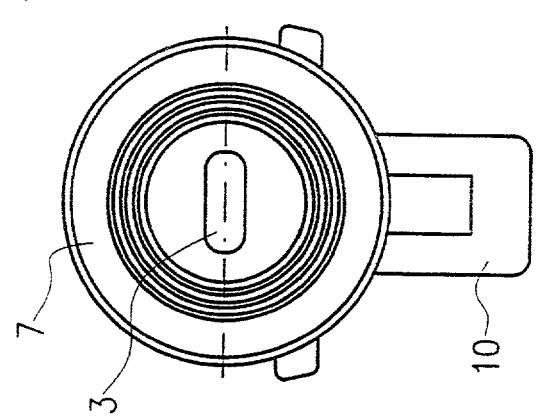
FIG. 3 shows a front view of the inductive sensor shown in FIGS. 1 and 2.
Figure 4:
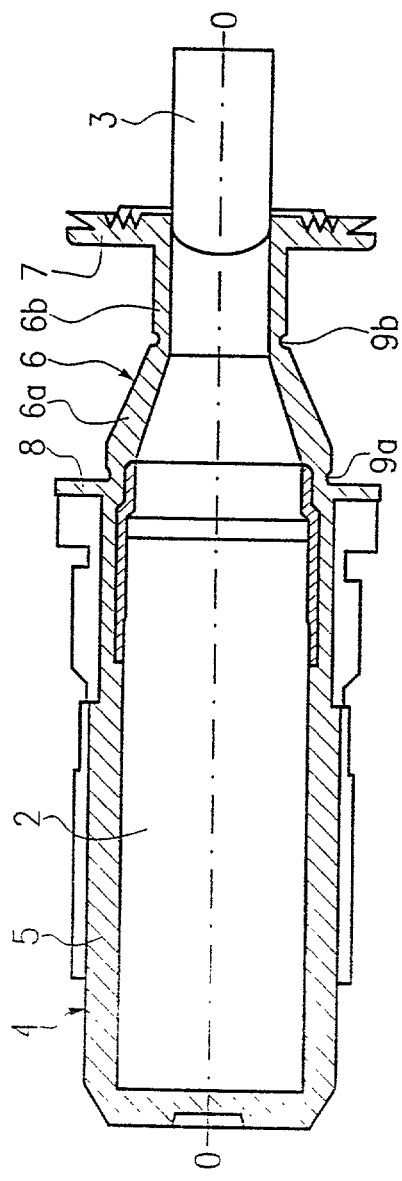
FIG. 4 shows a sectional view of an inductive sensor according to the related art.
Figure 5:
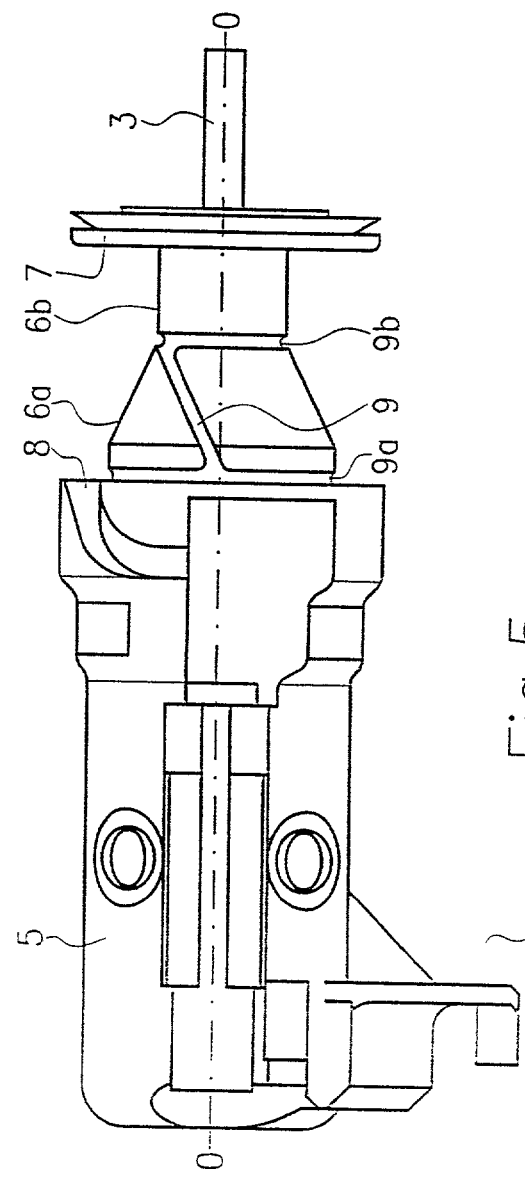
FIG. 5 shows a side view of the inductive sensor shown in FIG. 4 according to the related art.

An embodiment of an inductive sensor according to the present invention is shown in FIGS. 1 through 3. As shown in FIG. 1 in particular, the inductive sensor 1 comprises a magnet 2 produced out of AlNiCo with a pole pin 3 situated on one end.

The magnet 2 is completely surrounded by a housing 4 produced out of plastic, whereby the pole pin 3 projects out of the housing 4. The housing 4 is designed as a single part and comprises a main housing body 5 and a coil base body 6. Moreover, a first coil shield 7 and a second coil shield 8 are also designed as a single part with the housing 4. Polyamide PA6.12, for example, can be used as the material for the housing.

As shown in FIGS. 1 and 2, the coil base body 6 is situated between the first coil shield 7 and the second coil shield 8. The coil base body 6 is hereby designed in a slightly conical shape, whereby the larger diameter D1 of the cone of the coil base body 6 is situated at the second coil shield 8, and the smaller diameter D2 is situated at the first coil shield 7. As shown in FIGS. 1 and 2, the coil base body is designed entirely in the shape of a cone in its axial elongation in the direction of the axis 0-0, and does not have any cylindrical zones at its joints with the coil shields 7 and 8. As shown in FIG. 1, the angle $\alpha$ between a line parallel to the axis 0-0 and a surface line of the conical coil base body 6 is thereby $\alpha = 2.85°$ C. An angular range of $2.5° < \alpha < 3.2°$ is advantageous in this case, whereby the lower range can also possibly extend to 1.0°.

Furthermore, a mounting flange 10 is provided on the housing 4 (refer also to FIGS. 2 and 3), to which the connecting cable of the inductive sensor is attached.

After connecting the wire for the coil with a conductor rail 11, it is wound directly on the coil base body 6 designed in the shape of a cone. Due to the coil base body 6 designed slightly conical in shape, a parallel winding of the wire for the coil (not shown in the figures) can be achieved. This means that one wire loop of the coil is situated on the coil base body 6 next to the others. As a result, a geometry of the coil wire is achieved that can be determined in advance. This leads, on the one hand, to increased consistency of resistance and, on the other, it prevents problems that occur as a result of the extrusion coating of the coil, such as damage to the wire due to wire loops crossing over each other. Furthermore, the winding time can be markedly reduced, because placement into the coil base channels or the like is not required, and the total number of windings is reduced. Since the diameter D2 of the coil base body 6 is only slightly smaller than the diameter D1 (refer to FIG. 1), the number of windings can also be markedly reduced as compared to the related art, while maintaining the same performance features. Material and production costs can be reduced as a result.

The mode of operation of the inductive sensor is sufficiently known and therefore need not be explained in extensive detail. When current is flowing through the coil, a measuring signal is created depending on the component to be measured. If a ferromagnetic pulse-generating wheel, such as a toothed wheel or a toothed disk, is now moved past the pole pin 3, the distance between the toothed wheel and the pole pin changes due to the teeth and the intermediate spaces between the teeth as the toothed wheel moves. This means that the width of the air gap between the pole pin 3 and the toothed wheel is changed. The magnetic field is thereby influenced and a measuring signal is therefore created.

The inductive sensor according to the invention for contactless detection of a ferromagnetic object such as a toothed wheel or a toothed disk can be used in particular as an rpm sensor at wheels for an antilock system or also with other inductive sensors such as a rotational-speed sensor.

In summary, the present invention therefore concerns an inductive sensor for the contactless detection of a ferromagnetic object. The sensor has a housing 4 with a main housing body 5 and a coil base body 6, whereby a coil is wound around the coil base body 6. Furthermore, the sensor comprises a magnet 2 that is situated in the housing and has a pole pin 3. The coil base body 6 of the housing 4 is thereby designed entirely conical in shape, in particular slightly conical in shape.

The preceding description of the embodiment according to the present invention is intended for illustrative purposes only and is not intended to limit the invention. Various changes and modifications are possible within the scope of the invention without abandoning the scope of the invention or its equivalents.

What is claimed is:

1. Inductive sensor, in particular rpm, having
a housing with a main housing body and a coil base body with coil shields, whereby a coil is wound around the coil base body, and a magnet that is situated in the housing and has a pole pin, wherein the coil base body between the coil shields is designed entirely conical in shape and has an outer conical surface extending continuously all the way from one of the coil shields to the other of the coil shields.

2. Inductive sensor according to claim 1, wherein the coil base body has a conicity with an angle ($\alpha$) of 2.85°.

3. Inductive sensor according to claim 1, wherein the main housing body and the coil base body are designed as a single part.

4. Inductive sensor according to claim 1, wherein the coil is wound in parallel on the coil base body.

5. Inductive sensor according to claim 4, wherein the parallel winding of the coil on the coil base body extends from a first coil shield to a second coil shield.

6. Inductive sensor according to claim 1, wherein the coil base body is produced out of PA6.12.

7. Inductive sensor according to claim 1, wherein the number of windings of the coil is <6800 windings.

8. Inductive sensor according to claim 1, wherein the coil has an extrusion coating that is produced out of the same material as the coil base body.

9. Inductive sensor, in particular rpm, having a housing with a main housing body and a coil base body with coil shields, whereby a coil is wound around the coil base body, and a magnet that is situated in the housing and has a pole pin, wherein the coil base body between the coil shields is designed entirely continuously conical in shape, with a largest diameter situated at the one coil shield and a smallest diameter situated at the other coil shield.

10. Inductive sensor, in particular rpm, having a housing with a main housing body and a coil base body with coil shields, whereby a coil is wound around the coil base body, and a magnet that is situated in the housing and has a pole pin, wherein the coil base body between the coil shields is designed entirely continuously conical in shape, the coil base body has a conicity in the angular range $2.5°<\alpha<3.2°$.

* * * * *